United States Patent [19]
Clem

[11] 4,398,740
[45] Aug. 16, 1983

[54] CHAIN DRIVE FOR A BICYCLE

[76] Inventor: Victor L. Clem, 5316 Stellhorn Rd., Fort Wayne, Ind. 46815

[21] Appl. No.: 328,124

[22] Filed: Dec. 7, 1981

[51] Int. Cl.³ .............................................. B62M 9/02
[52] U.S. Cl. .................................. 280/261; 280/259; 474/84
[58] Field of Search ................. 280/26, 259, 236, 238; 474/84

[56] References Cited
U.S. PATENT DOCUMENTS

| | | | |
|---|---|---|---|
| 426,855 | 4/1890 | Reed | 280/261 |
| 528,145 | 10/1894 | Carr | 474/84 |
| 632,623 | 9/1899 | Bartlett | 474/84 |
| 644,411 | 2/1900 | Deafenbaugh | 280/238 |

*Primary Examiner*—Joseph F. Peters, Jr.
*Assistant Examiner*—Donn McGiehan

*Attorney, Agent, or Firm*—Gust, Irish, Jeffers & Hoffman

[57] ABSTRACT

A chain drive for use on a bicycle having a conventional frame and wheels. The chain drive comprises a wheel hub mounted for rotation on the frame. The opposite end portions of the hub are disposed on opposite sides of the frame, respectively. Two sprocket devices are mounted on the opposite end portions, respectively, of the hub for imparting rotation thereto. A pedal operated crank is also mounted for rotation on the frame, and includes two coaxial sprockets secured to the opposite ends of the crankshaft. The crank sprockets are axially spaced, parallel and disposed on the opposite sides, respectively, of the frame. The two sprocket devices and the two crank sprockets are radially aligned, respectively, one sprocket device being associated with one crank sprocket. Two chains are mounted on the aligned sprocket devices and crank sprockets, respectively, for driving the wheel hub by means of the crank.

7 Claims, 5 Drawing Figures

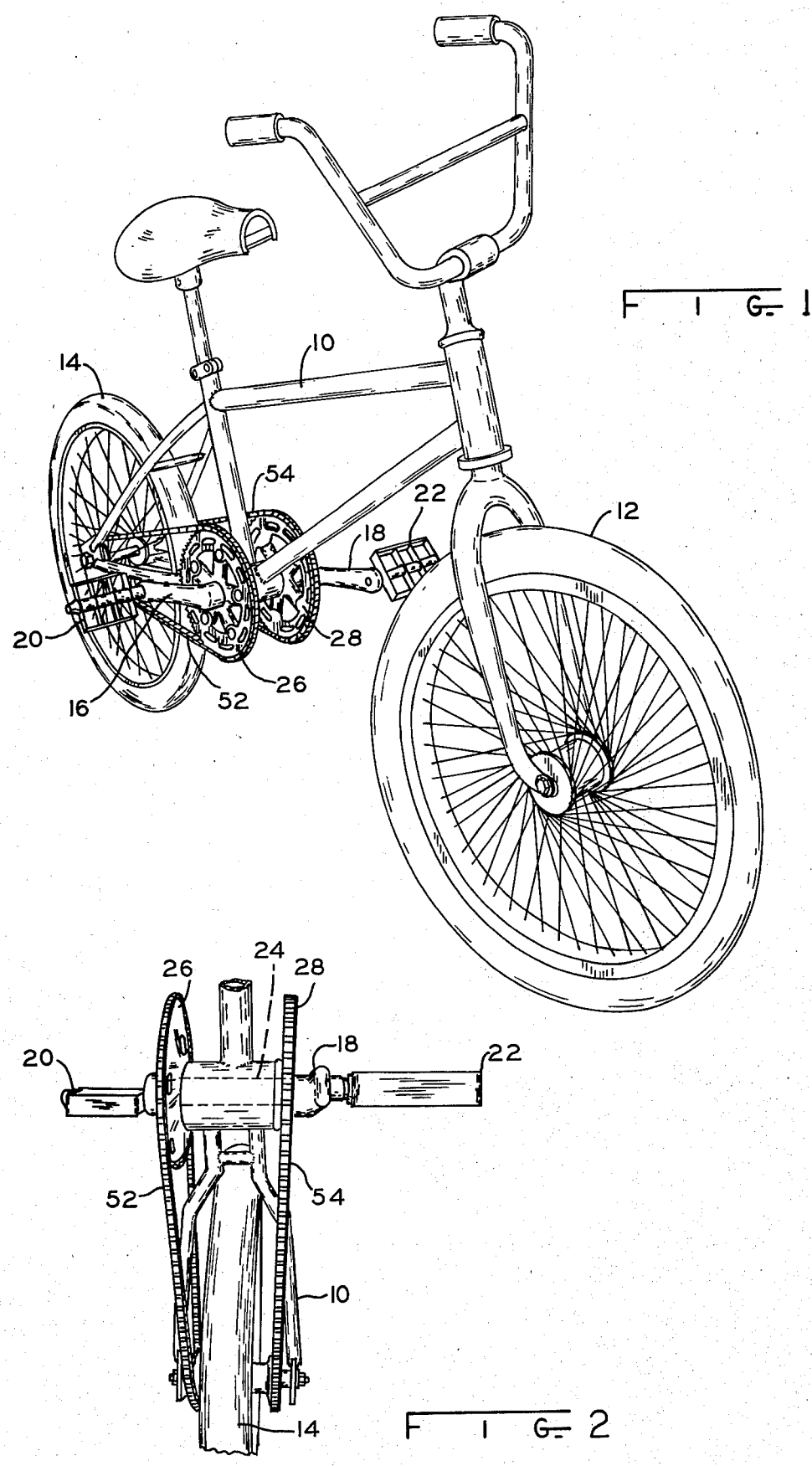

CHAIN DRIVE FOR A BICYCLE

BACKGROUND OF THE INVENTION

1. Field of the Invention

The present invention relates to bicycles, and more particularly to chain drives therefor. 2. Description of the Prior Art Conventional chain drives for bicycles normally employ a single pedal operated sprocket in combination with a single driving sprocket mounted on the hub of the rear wheel. On tandem bicycles, it is conventional to employ two pedal operated cranks having interconnecting chain drives as well as an additional drive on one side of the bicycle to the rear wheel. Racing bicycles commonly employ a single chain drive on one side of the bicycle.

It has been found that the single chain drive arrangements in racing bicycles suffer from a loss of conversion efficiency between the torque applied to the pedals and the power actually applied to rotate the wheel. This is thought to be due to the pedal operated crank flexing some under operation stress. It has been discovered that stiffening the crank assembly through the use of a symmetrically arranged, double crank system provides for an improvement in this conversion efficiency.

SUMMARY OF THE INVENTION

In this invention, a pedal operated chain drive includes a wheel hub which is mounted for rotation on the bicycle frame. The hub is provided with opposite end portions disposed in alignment with the opposite sides, respectively, of the bicycle frame. Two sprocket devices are mounted on the opposite end portions, respectively, of the wheel hub for imparting rotation thereto. A pedal operated crank is also mounted for rotation on the frame and has two coaxial sprockets secured thereto for rotation therewith. The crank sprockets are axially spaced, parallel and disposed on opposite sides, respectively, of the frame. The two sprocket devices and the two crank sprockets are radially aligned, respectively, one sprocket device with one crank sprocket. Two chains are mounted on the aligned sprocket devices and crank sprockets, respectively, for imparting rotational drive from the crank to the wheel hub.

The sprocket devices are free-wheeling relative to the wheel hub when the bicycle is coasting forwardly but are drivingly engageable therewith when rotated in the forward direction at a rate faster than the wheel hub. In one working embodiment, the two sprocket devices are alike, the two crank sprockets are alike, and the two chains are alike, the sprocket devices, the crank sprockets and the two chains being symmetrically arranged on opposite sides of the frame and with respect to the wheel hub and crank. Comprehended within the foregoing, the two sprocket devices are oppositely threadedly coaxially secured to the wheel hub end portions, respectively, the threading being in a tightening direction when forward driving force is imparted to the wheel hub.

It is an object of this invention to provide an improved chain drive for a bicycle.

The above-mentioned and other features and objects of this invention and the manner of attaining them will become more apparent and the invention itself will be best understood by reference to the following description of an embodiment of the invention taken in conjunction with the accompanying drawings.

BRIEF DESCRIPTION OF THE DRAWINGS

In the drawings,

FIG. 1 is a perspective view of a bicycle employing an embodiment of this invention;

FIG. 2 is a view of the same bicycle, in an inverted position;

DESCRIPTION OF THE PREFERRED EMBODIMENT

Figure 3:
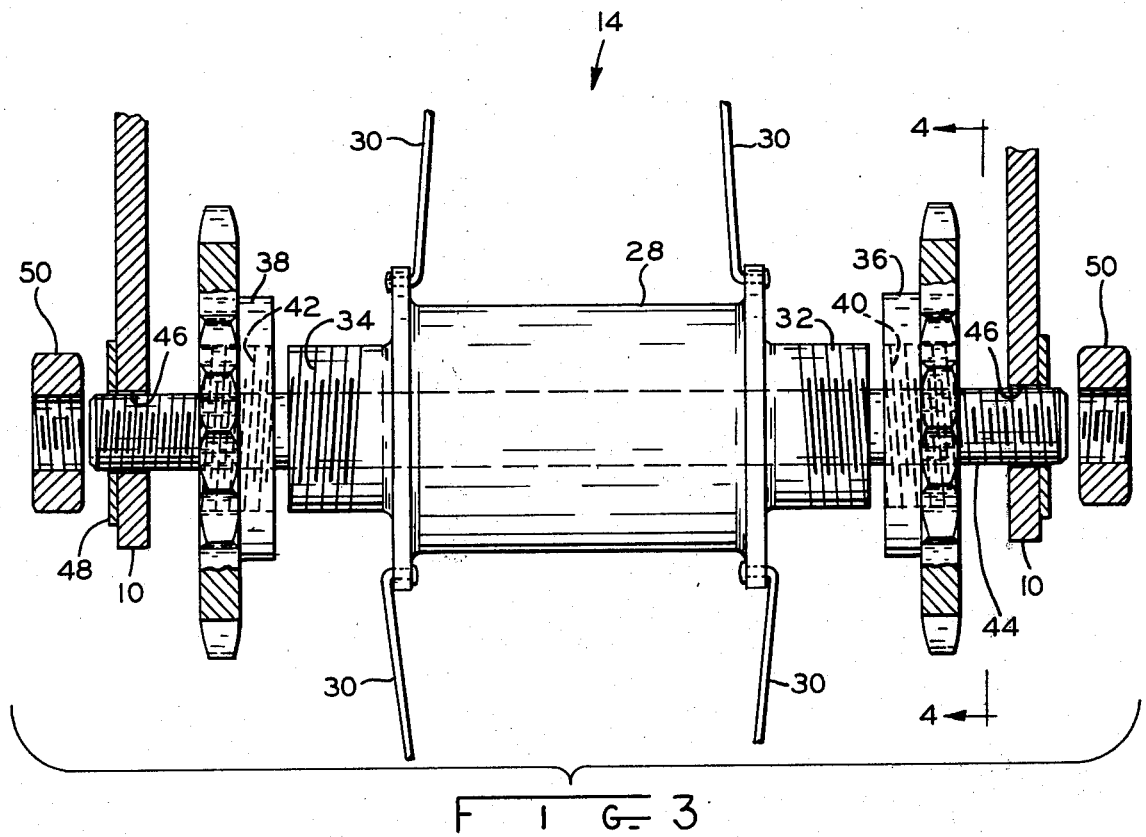
FIG. 3 is a fragmentary side view, in partially exploded form, of the rear hub portion of the bicycle.
Figure 4:
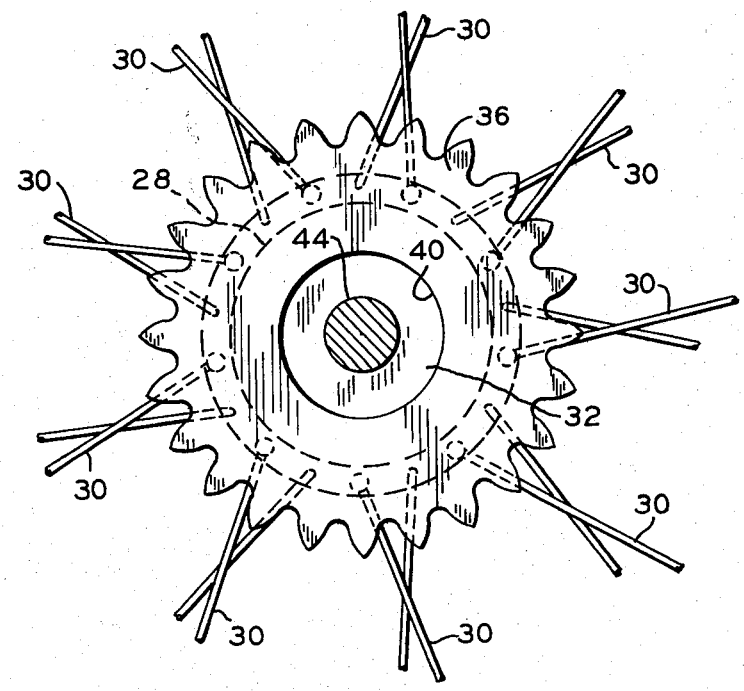
FIG. 4 is a fragmentary cross section taken substantially along section line 4—4 of FIG. 3.

Referring to the drawings, the bicycle of FIGS. 1 and 2 is conventional insofar as the frame 10 and wheels 12 and 14 are concerned. Mounted on the frame is a pedal operated crank assembly which includes two crank arms 16 and 18, two pedals 20 and 22, and a single shaft 24 secured at its opposite ends to the two cranks 16 and 18, which is mounted for rotation within the frame 10 by means of the customary bearings and threaded retainers (not shown). Rigidly secured to the opposite ends of the shaft 24 in coaxial alignment are two drive sprockets 26 and 28, respectively, these sprockets being identical and disposed in parallelism on the opposite sides of the bicycle frame 10.

The rear wheel 14 includes a hub 28 and the usual spokes 30. The opposite end portions 32 and 34 of the hub 28 are oppositely externally threaded as shown, for having secured thereto two sprocket devices 36 and 38 by means of matching internal threads 40 and 42. A conventional axle or spindle 44 is coaxially received by the hub 28 and is therein supported by means of conventional bearings, cones and threaded retainers. The outer end portions of the spindle 44 are received through openings 46 in the frame 10 and are secured thereto by means of the usual washers and nuts 48 and 50.

The sprocket devices 36 and 38 are conventional in the respect that they are of a free-wheeling design, including a one way clutch or ratchet. Suitable such devices are sold under the trademark SUN TOUR and are manufactured and sold by Maeda Industries, Ltd. of Japan. In particular, these sprocket devices 36 and 38 are so arranged that when they are rotated forwardly at a rate faster than the rotation of the wheel hub 28, lock-up occurs and a driving force is imparted to the wheel hub by means of the sprocket device 36, 38. On the other hand, when the bicycle is coasting, and no rotational drive is imparted to the sprocket devices 36, 38, the wheel hub 28 rotates freely relative to the sprocket portions of the devices 36, 38.

In a working embodiment of this invention, the threads 32 are righthand and the threads 34 are lefthand. The reason for this is that applied forward torque to both of the sprocket devices 36 and 38 will be in a tightening direction thereby assuring that the rotational force applied to the hub 28 will not loosen the sprocket devices.

The sprockets 26 and 28 and the sprocket devices 36 and 38 on opposite sides of the frame 10 are in radial alignment. Around these aligned sets are trained two like drive chains 52 and 54.

In operation, the bicycle is manipulated in a conventional manner, the pedals 20 and 22 being operated by the feet to cause rotation of the sprockets 26 and 28 and the sprocket devices 36 and 38. When pedaling in a foward direction, the one way clutch or ratchet devices within the sprocket devices 36 and 38 engage thereby interlocking the sprockets and chains with the wheel hub 28. The wheel hub 28 is driven in a forward direction. If it is desired to coast, the rider stops pedaling whereupon the sprocket devices 36 and 38 stop rotating. The wheel hub 28 continues to rotate by reason of the one way clutch or ratchet.

By reason of the sprockets 26 and 28 being mounted on opposite ends of the crank shaft 24 and immediately adjacent to the respective crank arms 16 and 18, the crank assembly is rendered more rigid during operation. Because of this greater rigidity and consequent stiffness, more useful power can be transmitted from the sprockets 26 and 28 to the companion wheel sprocket devices 36 and 38, respectively. Even transmission of torque to the rear wheel is assured by reason of the fact that the portions of the chain drive on opposite sides of the bicycle frame are congruent and symmetrically arranged. Therefore, as the crank arms 16 and 18 are rotated, an even balance of torque is applied to the rear wheel. The sprockets 26 and 28 may be in the form of a Sugino chain-ring as manufactured by Sugino of Japan or a Sun Tour as manufactured by Maeda Industries, Ltd. of Japan. The crank arms 16 and 18 are preferably fabricated of a lightweight but strong alloy.

Figure 5:
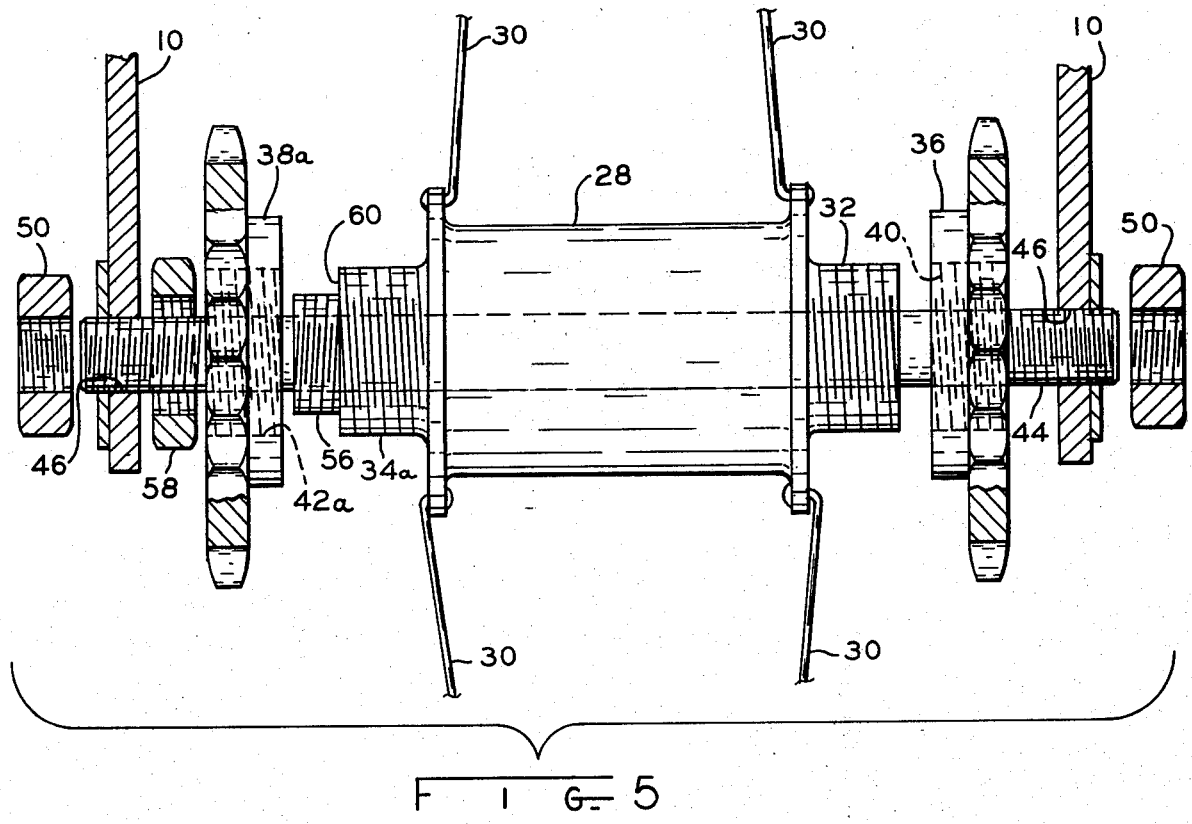
FIG. 5 is a view like FIG. 3 but of a different preferred embodiment of the rear hub assembly.

FIG. 5 illustrates a preferred form of the rear hub assembly, like numerals indicating like parts. The lefthand end of the hub 28 is formed with two, stepped diameter threaded end portions 34a and 56, portion 34a having a righthand thread and portion 56 a lefthand thread. The sprocket device 38a has an internal righthand thread 42a which matches righthand thread 34a. When sprocket device 38a is fully threaded onto the thread 34a, the end portion 56 protrudes therebeyond to receive a lock ring 48 having lefthand female threads which match the threads on portion 56. Lock ring 58 is tightened against the radial shoulder 60, and clearance is provided between lock ring 58 and sprocket device 38a to permit relative rotation therebetween. This clearance corresponds to that provided when lefthand frame member 10 (FIG. 3) is engaged with the outer end of end portion 34.

Finally (FIG. 5) lefthand frame element 10 is abutted against the outer end of end portion 56 and/or lock ring 58 by tightening lefthand nut 50 onto the spindle 44.

The FIG. 5 design is preferred for the reason that the sprocket device 38a does not have to be provided with lefthand threads, the more common righthand threads being more available and therefore more economical. Only the end portion 56 and lock ring 58 need to have lefthand threads. By reason of the lefthand threads on the reduced diameter end portion 56, any frictional rubbing of the sprocket device 38a with the lock ring 58 will serve to maintain the latter tightened. The diameter of the end portions 32, 34 and 34a is preferably the same.

While there have been described above the principles of this invention in connection with specific apparatus, it is to be clearly understood that this description is made only by way of example and not as a limitation to the scope of the invention.

What is claimed is:

1. A double drive wheel hub assembly for a bicycle comprising a wheel hub having opposite end portions, two sprocket devices mounted on said opposite end portions, respectively, for imparting rotation in a common direction to said hub, said sprocket devices being free wheeling relative to said hub when the latter is rotating in one direction but are drivingly engageable therewith when rotated in the same direction at a rate faster than said hub, said two sprocket devices being commonly threadedly coaxially secured to said hub end portions, respectively, means threaded oppositely on one of said end portions for further retaining the adjacent sprocket device on the same end portion, the threading of said means and the other sprocket device being in a tightening direction when said sprocket device is rotated at said faster rate.

2. The hub assembly of claim 1 wherein said means includes a threaded reduced diameter distal end portion on the wheel hub which defines a radial shoulder with the adjacent end portion of the wheel hub, and a lock ring threaded onto said distal end portion and engageable with said shoulder thereby to further retain the adjacent sprocket device on said wheel hub.

3. The hub assembly of claim 2 wherein the threading of said sprocket devices on said end portions, respectively, is right-hand and the threading of said lock ring is left-hand.

4. The hub assembly of claim 3 wherein said opposite end portions onto which said sprocket devices is threaded are of equal diameter.

5. The hub assembly of claim 1 wherein said means includes a threaded reduced diameter distal end portion on the wheel hub, and a lock ring threaded onto said distal end portion to further retain the adjacent sprocket device on said wheel hub.

6. For use in a bicycle having a frame and wheels, a pedal operated chain drive comprising a wheel hub mounted for rotation on said frame, said hub having opposite end portions on opposite sides, respectively, of said frame, two sprocket devices mounted on said opposite end portions, respectively, for imparting rotation in a common direction to said hub;

a pedal operated crank mounted for rotation on said frame, two coaxial sprockets secured to said crank for rotation therewith, said crank sprockets being axially spaced, parallel and disposed on opposite sides, respectively, of said frame;

said two sprocket devices and said two crank sprockets being radially aligned, respectively, one sprocket device with one crank sprocket;

and two chains on said aligned sprocket devices and crank sprockets, respectively, for imparting rotational drive from said crank to said wheel hub; said sprocket devices being free wheeling relative to said wheel hub when the bicycle is coasting forwardly but are drivingly engagable therewith when rotated in a foward direction at a rate faster than said wheel hub; said crank including a common shaft rotatably mounted on said frame, said crank sprockets being secured to the opposite ends, respectively, of said shaft such that said two chains lie in parallel planes, respectively, on opposite sides of said frame; said two sprocket devices being alike, said two crank sprockets being alike, and said two chains being alike, said sprocket devices, said crank sprockets and said two chains being symmetrically arranged on opposite sides of said frame and with respect to said wheel hub and crank; said two sprocket devices being commonly threadedly coaxially secured to said wheel hub end portions, respectively, means threaded oppositely on one of said end portions for further retaining the adjacent sprocket device on the same end portion, the threading of said means and the other sprocket device being in a tightening direction when forward driving force is imparted to said wheel hub.

7. The chain drive of claim 6 wherein said means includes a threaded reduced diameter distal end portion on the wheel hub which defines a radial shoulder with the adjacent end portion of the wheel hub, and a lock ring threaded onto said distal end portion and engageable with said shoulder thereby to further retain the adjacent sprocket device on said wheel hub.

* * * * *